United States Patent [19]

Dell

[11] 4,244,935
[45] Jan. 13, 1981

[54] METHOD OF FORMING METAL CHLORIDES

[75] Inventor: M. Benjamin Dell, Pittsburgh, Pa.

[73] Assignee: Aluminum Company of America, Pittsburgh, Pa.

[21] Appl. No.: 897,950

[22] Filed: Apr. 20, 1978

[51] Int. Cl.³ .............................................. C01B 9/00
[52] U.S. Cl. .................................... 423/491; 423/492; 423/493; 423/494; 423/496; 423/137; 427/221
[58] Field of Search ........ 423/496, 136, 137, 491–494; 208/50, 126, 127; 427/221, 245, 213, 215; 252/447, 422, 421

[56] References Cited

U.S. PATENT DOCUMENTS

| | | | |
|---|---|---|---|
| 1,749,854 | 3/1930 | Bitterfield | 423/168 |
| 1,865,008 | 6/1932 | Holm | 252/422 |
| 1,878,013 | 9/1932 | Staib | 423/136 |
| 3,102,047 | 8/1963 | Rwington | 427/228 |
| 3,811,916 | 5/1974 | Russel | 423/496 |
| 3,842,163 | 5/1974 | Russel | 423/496 |
| 4,139,416 | 2/1979 | Palumbo | 201/8 |

FOREIGN PATENT DOCUMENTS 1204353  9/1970  United Kingdom ...................... 23/141

Primary Examiner—Sam Silverberg
Attorney, Agent, or Firm—Daniel A. Sullivan, Jr.; Lyndanne M. Whalen

[57] ABSTRACT

A method of forming the chloride of a metal-oxygen-containing substance, including the steps of coating particles of such substance with green carbon, i.e. carbon which contains substances more volatile than carbon, heating the coated particles to drive off the volatile matter and produce openings such as pores and fissures, and then reacting the particles from the step of heating with a source of chlorine.

11 Claims, 4 Drawing Figures

Figure 3  |—X—|
Figure 4  |—Y—|

METHOD OF FORMING METAL CHLORIDES

BACKGROUND OF THE INVENTION

The present invention relates to a method of chlorinating metal-oxygen substances by first coating them with carbon.

It is known to react certain metal oxides, such as those of aluminum, titanium and iron, as well as minerals, e.g. clay, containing these metals and oxygen, with chlorine and carbon. It is possible to supply the chlorine and the carbon in the form of compounds containing the same, for example $CCl_4$ and CO, as well as in the form $Cl_2$ and elemental carbon. This reaction is termed a "reduction-chlorination" in the article entitled, "Hydrogen Affinities—A New Ordering of Metals to Accomplish Difficult Separations", by D. F. Othmer and R. Nowak, *AIChE Journal*, Volume 18, No. 1, pp. 217-220 (January 1972). It is in this sense that the terms "reduction-chlorination" and "reduction-chlorination process" are used herein.

It is known to provide the carbon as a coating on alumina by spraying it at elevated temperatures with a hydrocarbon material, such as fuel oil. See U.S. Pat. No. 3,811,916, issued May 21, 1974, for "Method for Carbon Impregnation".

U.S. Pat. No. 2,725,349, issued Nov. 29, 1955, for "Fluid Coking with Alumina Seeds", describes fluid coking techniques using seeds of aluminum oxide. There is a much larger build-up of carbon than in U.S. Pat. No. 3,811,916. The carbon is deposited in a green form containing volatiles, and the resulting particulate, petroleum coke product, is calcined to drive off such volatiles to make the product suitable for use in anodes in the Hall-Heroult cell for the production of aluminum.

U.S. Pat. No. 3,842,163, issued Oct. 15, 1974, for "Production of Aluminum Chloride", discusses the chlorination of alumina in the presence of carbon which has been coated on the alumina particles utilizing techniques as described in U.S. Pat. No. 3,811,916. In this procedure, the alumina has an alpha-alumina content of less than about 5% by weight.

Another chlorination process is that described in U.S. Pat. No. 2,805,120, where coal is used to agglomerate particles of ore to form briquettes. The briquettes are subsequently calcined to remove volatile hydrocarbons before the briquettes are contacted with chlorine for the chlorination step. The use of coal, which also acts as an agglomerating agent to bind the ore particles into briquettes, represents quite a different approach to providing the carbon in reduction-chlorination reactions as compared with the techniques of U.S. Pat. No. 3,842,163, where oil is coked on the ore particles, and U.S. Pat. No. 3,811,916 where both oil and gaseous hydrocarbons are coked on the ore to form individual, carbon-coated particles suitable for chlorination in a fluidized bed reactor.

SUMMARY OF THE INVENTION

It is an object of the present invention to provide a new and improved reduction-chlorination process based on a fluid (i.e., liquid or gaseous) coking technique.

This as well as other objects which will become apparent in the discussion that follows are achieved according to the present invention by providing a method of chlorinating particles of a substance containing metal and oxygen, comprising coking with a gaseous or liquid coking charge stock on such particles for coating them with carbon which contains volatile matter, heating the coated particles for driving off the volatile matter and for creating openings in the coating, and exposing the particles with the thus-opened coating to a source of chlorine for producing the chloride of said metal. Successful chlorination is accomplished beyond the limits formerly fixed by the amount of materials normally unreactive with respect to chlorine, such as alpha-alumina.

BRIEF DESCRIPTION OF THE DRAWINGS

FIGS. 3 and 4 are scanning electron micrographs of carbon-coated alumina, magnification being characterized by the distances X and Y equaling $1 \times 10^{-3}$ inches.

DESCRIPTION OF THE PREFERRED EMBODIMENTS

Figure 1:
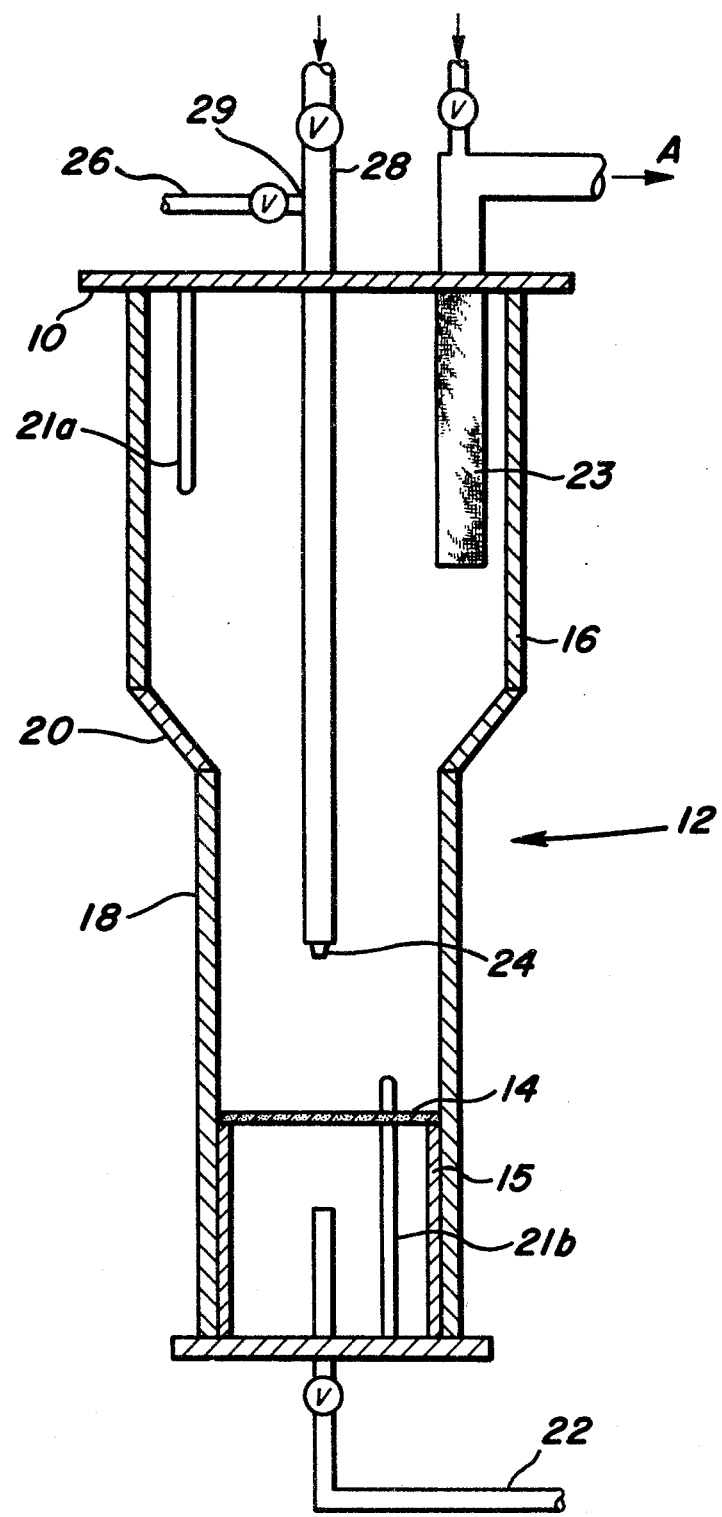
FIGS. 1 and 2 are schematic drawings of apparatus suitable for practice of the present invention.

Substances which can be chlorinated according to the present invention contain metals such as Al, Ti, Si and Fe, in accompaniment with oxygen. Examples are alumina, titania, silica, hematite, goethite, bauxite, clay, aluminum hydroxide, etc. These substances, which are characterized by a low reactivity with chlorine as explained in the abovecited article of Othmer and Nowak, are typically chlorinated with the help of carbon.

In this invention, two steps are involved in preparing the metal-oxygen substance for chlorination: (1) coking of oil to create a carbon coating on individual particles of the substance, and (2) heating to drive off volatiles. Coking is at a temperature sufficiently low that the deposited carbon contains volatile matter. This is a distinctive aspect of the present invention as compared with the oil coking in U.S. Pat. No. 3,811,916 and 3,842,163, where the coking is done at a sufficiently high temperature that essentially no volatiles appear in the coked product. In the present invention, subsequent heating opens the carbon coating by creating cracks, holes, and the like thereby exposing more reactive surface. These openings were observed in scanning electron micrographs taken of products of the present invention, such as FIG. 3. Such openings are not seen in FIG. 4, a micrograph of particles coated by the prior art procedure described in the following Example II. It is believed that this opening is a result of the removal of the volatile matter.

Material used for coking to produce a carbon coating on the particles in the present invention is generically referred to as "coking charge stock". Included under this term are, as brought out in U.S. Pat. No. 2,725,349, heavy hydrocarbon oil feeds, such as heavy or reduced crudes, vacuum bottoms, pitch, natural asphalt, other heavy hydrocarbon residua or mixtures thereof. According to U.S. Pat. No. 2,725,349, typically such feeds can have an initial boiling point of about 700° F., an A.P.I. gravity of about 0° to 20°, e.g., 1.9°, and a Conradson carbon residue content of about 5 to 40 weight percent. (As to Conradson carbon residue, see ASTM Test D-180-52.) These substances may be liquid or gaseous at such coking temperatures.

The temperature range for the carbon deposition by coking is necessarily limited to that in which all volatile materials would not be driven off from the carbon during the coating process. Acceptable limits have been found to be preferably 450°–725° C., although a more preferred range is 450°–650° C. The temperature ranges for the single step carbon deposition given in both U.S. Pat. Nos. 3,842,163 (800°–1100° C.) and 3,811,916 (750°–1100° C.) are, therefore, inappropriate. The upper end of the temperature range of 2,725,349 (range=45- 0°–815° C.) is also too high for this step of the present invention.

The subsequent heating step which results in the removal of the volatiles and consequent opening of the carbon coating may preferably be conducted at 700°–1100° C., with 700°–850° C. being a more preferred range. Thus, of the present invention's two steps for preparing the metal-oxygen substance for chlorination (first, carbon deposition and, second, opening up the coating), it is the heating to drive off the volatiles and open up the coating which is conducted within the limits described in U.S. Pat. Nos. 3,811,916 and 3,842,163 as appropriate for the carbon deposition step.

Chlorination may be carried out according to the teachings of U.S. Pat. No. 3,842,163, preferably at temperatures greater than 400° C. Unlike 3,842,163, however, rapid chlorination is achieved in the present invention whether or not the starting material meets certain defined acceptable limits, such as an alpha-alumina content below the 5% level. This elimination of the need to use starting materials within strict limits is attributed to the opening up of the carbon surface achieved by volatilization of the volatile matter within the carbon coating and resultant exposure of more reactive surface. The higher reactivity of alumina, even in the presence of significant amounts of the formerly limiting factor of alpha-alumina seen in the examples below, e.g., permits increased chlorination throughput and reduces accumulation of alpha-alumina in the system.

In addition to improvement of chlorination results, the present invention's carbon deposition step produces liquid and gaseous by-products which can be recovered and utilized.

While the temperature in the coking vessel may be maintained by use of a burner vessel, the necessary heat may also be supplied in part by charging the coating vessel with alumina which is still at high temperature after leaving the calciner of a Bayer process installation. As noted above, background information on fluid coking for use in the present invention is available in U.S. Pat. No. 2,725,349. Information on calcining in the Bayer process can be found in the *Kirk-Othmer Encyclopedia of Chemical Technology*, 2nd Ed., Vol. 1, pp. 934–40, Interscience Publishers, New York, and U.S. Pat. No. 3,839,167 of William C. Sleppy, issued Oct. 1, 1974, for "Noval Alumina Feed for Aluminum Cell".

Further illustrative of the invention are the following examples:

EXAMPLE I

The top cover 10 of fluid coking reactor 12 of FIG. 1 was removed and 1500 gms of alumina as the particulate substance were placed on the porous sintered stainless distributor plate 14, which plate was supported by a pedestal 15. The alumina used had the following properties:

Surface area: 96 m²/g
Alpha content: <0.5%
Particle size: −100 to 200 mesh Tyler The high surface area and low alpha content are typical of what is referred to in the aluminum industry as "partially calcined alumina" (PCA). The coking reactor was constructed of two cylindrical stainless steel pipe sections, an upper disengaging section 16 and lower section 18 (3-inch inner diameter), welded together with conical section 20 interposed between sections 16 and 18. The overall height of the reactor was about 32 inches. Thermocouples in tubes 21a and 21b enabled temperature measurement at their respective locations.

Nitrogen gas was introduced through line 22 to fluidize the alumina charge. Exhaust gas left through refractory filter 23 and entered a condensing and sampling train. A valve at the top of the filter allowed nitrogen gas to enter and blow the filter free of any adhering particles. The fluidized bed within lower section 18 was maintained at a temperature of 510°–520° C., while the disengaging section 16 was kept at 400° C. to prevent condensation of the volatiles. Tube furnaces (not shown) around the outside of sections 16 and 18 were used to maintain these temperatures. Because fluidization at the 510° C. operating temperature could not be maintained in the small diameter reactor long enough to build up the desired amount of carbon, the run was carried out in three segments. Between segments, the reactor was cooled, the bed was removed, any aggregates in the bed were hand-pulverized, and the entire bed then placed back in the reassembled reactor for additional coking. During each segment about 1000 gms of oil which was atomized by nitrogen fed through line 28 were sprayed into the fluidized bed of alumina with nozzle 24 which was fed by oil line 26 at a rate of 350–380 gms/hr. The properties of the oil used are set forth in the following Table 1.

TABLE 1

| Properties of Oil Feed | |
|---|---|
| Sp. gravity, °API | 12.9 |
| Conradson carbon | 13.2% |
| Ash | 0.013 |
| S | 0.77 |
| C | 85.7 |
| H | 11.4 |
| Carbon type distribution as determined by nuclear magnetic resonance: | |
| aromatic | 23.8% |
| naphthenic | 15.7 |
| paraffinic | 60.5 |

This procedure resulted in a carbon content of 19.6 weight percent (wt.%). Weight percent of carbon was determined by measuring the weight of nonvolatile residue on ignition (R), determining the weight C by difference and using the formula:

$$\%C = \frac{100\,C}{C + R}$$

The product of the coking reaction was then calcined in a bed fluidized by nitrogen for 30 minutes at 800° C. A scanning electron micrograph of the calcined product was taken. During the carbon deposition in reactor 12, 8.3 gms of gas were produced, 4.9 gms gasoline, 57.8 gms heavy oil, 10.3 gms coke, and 18.8 gms were lost for every 100 gms of oil sprayed into the reactor.

Carbon was then burned off the calcined material at 700° C. for 25 minutes with air in a fluidized bed to simulate a fluid coker operation having separate coker and burner vessels and to see what effect such temperature would have upon the reactivity of the carbon-coated particles. On an industrial scale, this step would be unnecessary, because burning off excess carbon could be carried out simultaneously with the calcining.

Figure 2:
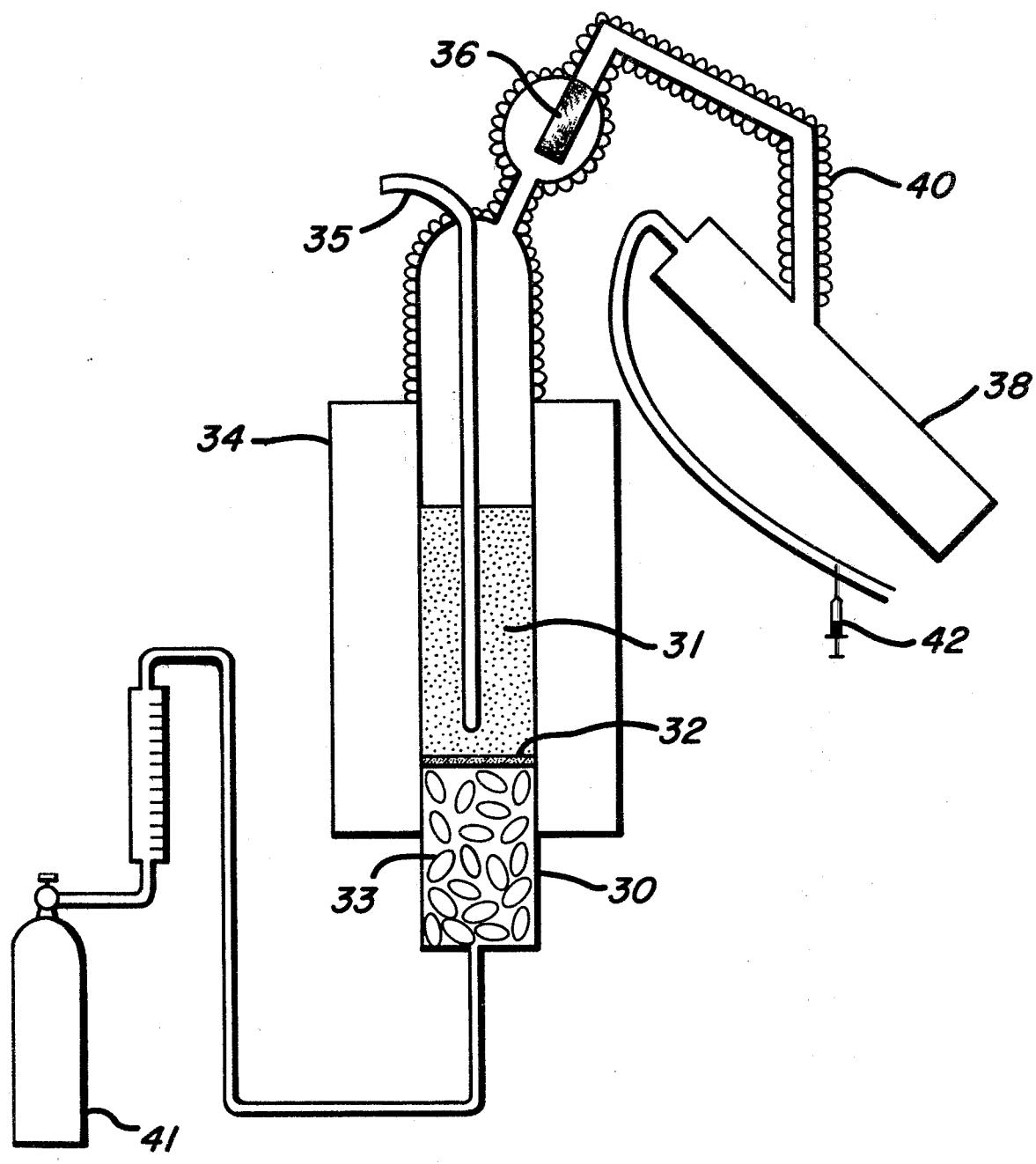

The product of the carbon burnoff had 18.1 wt.% carbon and a surface area of 54 m²/g. One hundred grams of this product were charged into the apparatus of FIG. 2 which apparatus includes a one-inch diameter quartz tube 30 with a fritted glass distributor 32 located three inches from the bottom of the quartz tube 30 and above the gas-distributing quartz bed aggregate 33. Heat was supplied to the reactor by tube furnace 34 to maintain a temperature of 550° C. as measured by thermocouple 35. A filter 36 and other glassware between the hot zone of the reactor and the aluminum chloride desublimer 38 were kept at 270° C., i.e. above the desublimation temperature of aluminum chloride, by means of heating tapes 40. Chlorine was fed from supply 41 to fluidize the charge 31. When the chlorination rate had stabilized (after about 45 minutes), a one ml sample of the gas leaving the chlorinator was withdrawn by syringe 42 and analyzed by gas chromatography. Reactivity was expressed as $Y_F$, the percentage of chlorine reacted. $Y_F$ was calculated from the analysis of the off-gas by the following approximate equation:

$$Y_F = \frac{2CO_2 + CO + COCl_2}{2CO_2 + CO + Cl_2 + 2COCl_2}$$

where the various gases are expressed in volume percent. This equation is an approximation due to the inability of the chromatograph to analyze for HCl, $SO_2$ and COS. A more precise determination of $Y_F$ can be obtained by using the equation:

$$Y_F = \frac{2CO_2 + CO + COCl_2 + 2SO_2 + COS}{2CO_2 + CO + 2COCl_2 + Cl_2 + 2SO_2 + COS + \frac{HCl}{2}}$$

where the gases are expressed in volume percent. The approximation of $Y_F$ used in these examples is adequate for purposes of comparison, however, due to the low levels of hydrogen and sulfur present. Each sample run involved equivalent low hydrogen levels due to calcination at 800° C. The low sulfur content was due to usage of the same low sulfur content feedstock described in Table 1 for all runs.

The effective amount of carbon present as CO in the off-gas was determined by the following equation:

$$\frac{100 (CO + COCl_2)}{CO_2 + CO + COCl_2} = \%C \text{ as } CO$$

where the gases are expressed as volume percent.

After 45 minutes of chlorination, the $Y_F$ was 86.3% and percent carbon as CO was determined to be 24.2%. After 100 minutes, a residue of 15 gms remained.

EXAMPLE II

For purposes of comparison, an experiment was run under conditions used in the prior art. The lower section 18 of reactor 12 was heated to 800° C., and the carbon coating was built up to the 19.9 wt.% carbon level. No extra calcination step was included, and none of the carbon coating was burned off. The scanning electron micrograph of the product showed the surface seen in FIG. 4.

For every 100 gms of oil fed to the reactor, the carbon deposition step produced 43.9 gms of gas, 2.8 gms of heavy oil, 39.8 gms of coke and 13.5 gms unaccounted for. After 45 minutes of chlorination, the $Y_F$ was 23.3% and percent carbon as CO was 19.5%. After 110 minutes, a residue of 71.9 gms remained. These results clearly indicate that the product obtained by coking at 800° C. is much less reactive to chlorine than is the product of Example I. The superiority of the results of Example I is attributed to the opening of the carbon coating and consequent exposure of more reactive surface achieved when coking at 510° C. is followed by an 800° C. calcination step. Coking at 510° C. enables deposition of both carbon and volatile materials, whereas 800° C. is too high a temperature for volatiles to be retained in the carbon being deposited on the particles. It is the escape of the volatiles in the coating upon secondary heating to 800° C. permitted in the procedure of Example I which is believed to produce the pores and fissures visible in the micrograph of FIG. 3 but missing in that of FIG. 4. The lower amount of exposed surface would reduce the rate of the chlorination.

EXAMPLE III

This experiment was conducted to determine whether the chlorination temperature had any effect upon $Y_F$. The procedure of Example I was followed with the exception that chlorination was carried out at 650° C. rather than 550° C. The surface area following burnoff at 700° C. measured 108 m²/g. After 45 minutes, $Y_F$ was 99.4%, and percent carbon as CO was 44%. After 95 minutes, 9.5 gms residue remained. These results indicate that the temperature of chlorination at which good results can be obtained is not limited to 550° C.

EXAMPLE IV

A surprising and unexpected aspect of the present invention is the reactivity of alumina of high alpha-alumina content achieved when the techniques of the present invention are followed. In the above-cited U.S. Pat. No. 3,842,163, the alumina has an alpha-alumina content of less than 5%. Surprisingly, it was discovered that an alumina with a 24% alpha content was chlorinated to a significant extent when proceeding according to the present invention. The procedure used in this experiment was, with the exceptions noted below, that set forth in Example I. The alumina was of the type referred to in the art as "metal grade alumina" or "MGA", having an alpha-alumina content of 24% and a surface area of 51 m²/g. This particular MGA had a particle size distribution of $-100$ to $+200$ mesh Tyler. The carbon was built up to the 21.9% level. During the carbon deposition process, for every 100 grams of oil fed, there were produced 8.7 grams gas, 6.9 grams of gasoline, 53.7 grams of heavy oil and 9.3 grams of coke with 21.5 grams unaccounted for. The calcined material was burned for 105 minutes to yield a final carbon content of 18.3 wt.% and a surface area of 84 m²/g. The chlorination was carried out at 650° C. $Y_F$ at 45 minutes was 98.9%, with the percent carbon as CO at the same time being 44.0%. The run was maintained for 95 minutes, and a residue of 8.9 grams was left at the end of the run. Comparison of this example with Example III shows that, surprisingly, it is possible by the present invention to obtain equally good chlorination, whether or not the alpha-alumina content is greater than 5%.

EXAMPLE V

This experiment was conducted to demonstrate that the carbon burnoff step used in Example I is not essential to the present invention. The procedure used was that described in Example I with the exception that the step of burning off carbon (at 700° C.) prior to chlorination was omitted. The $Y_F$ of the product was 78.9% at 45 minutes, while the percent carbon as CO at the same time was 21.5%. The residue at the end of 95 minutes was 28.0 grams.

While the $Y_F$ achieved was lower than that of Example I, this difference is insignificant when compared to chlorination results achieved by the Russell procedure (U.S. Pat. No. 3,842,163) followed in Example II, the product of which had a $Y_F$ of only 24.4% at 45 minutes, in contrast to the present invention's 81.0%. These results are interpreted to mean that the carbon coating itself need not be burned off to reduce carbon content to a particular percentage. The opening up of the coating achieved by removal of the volatiles will expose enough reactive surface area to yield good results without burning off the carbon coating itself.

EXAMPLE VI

The procedure used in Example III was repeated using coated particles with a surface area of 86 m²/g which was lower than that of Example III. The product had a $Y_F$ at 45 minutes of 97.5%, and percent carbon as CO of 43.0%. The residue after the 95-minute run was 11.5 grams.

These results indicate that the reactive surface exposed as a result of the escape of the volatiles in the carbon coating is largely responsible for the effectiveness of the chlorination as opposed to the initial surface area of the particles being chlorinated. If initial surface area were a significant factor, a difference in $Y_F$ much greater than 1.9% (99.4%–97.5%) would be expected with a decrease of 22 m²/g in surface area.

EXAMPLE VII

Alumina having an alpha content of 14 wt.% was coated with carbon by the procedure of Example I, except that the run consisted of two rather than three segments. After chlorination at 650° C., $Y_F$ was 99.4%. A residue of 8.9 gms was obtained, of which 4.5 gms were alpha-alumina. Since the 100 gms of feed used in the chlorination contained 14% alpha-alumina, and the residue contained only 4.5 gms, about 65% of the alpha-alumina must have reacted in the chlorination.

Percents herein are on a weight basis, unless indicated otherwise.

It will be understood that the above description of the present invention is susceptible to various modifications, changes and adaptations, and the same are intended to be comprehended within the meaning and range of equivalents of the appended claims.

What is claimed is:

1. A method of chlorinating particles of a substance containing metal and oxygen, comprising:
    coking a liquid or gaseous coking charge stock on such particles for coating them with carbon which contains volatile matter under conditions permitting retention of volatile matter,
    heating the coated particles for driving off the volatile matter and for creating openings in the coating, and
    exposing the particles with the thus-opened coating to a source of chlorine for producing the chloride of said metal.

2. A method as claimed in claim 1 wherein said metal is aluminum.

3. A method as claimed in claim 2 wherein the aluminum-oxygen substance is alumina.

4. A method as claimed in claim 3 wherein the alpha-alumina content in the substance is greater than 5%.

5. A method as claimed in claim 1 wherein the coking step is carried out in the temperature range of 450°–725° C.

6. A method as claimed in claim 1 wherein the coking step is carried out in the temperature range of 450°–650° C.

7. A method as claimed in claim 1 wherein the coking step is carried out in a fluidized bed by the spraying of said stock onto the particles.

8. A method as claimed in claim 1 wherein the heating step is carried out between 700°–1100° C.

9. A method as claimed in claim 1 wherein the heating step is carried out between 700°–850° C.

10. A method as claimed in claim 1 wherein the exposing step is carried out at temperatures greater than 400° C.

11. The method of claim 1 wherein the openings in the coating comprise cracks or fissures.

* * * * *

UNITED STATES PATENT AND TRADEMARK OFFICE
CERTIFICATE OF CORRECTION

PATENT NO.  : 4,244,935
DATED       : January 13, 1981
INVENTOR(S) : M. Benjamin Dell It is certified that error appears in the above-identified patent and that said Letters Patent are hereby corrected as shown below:

On the title page, under references cited:

| | |
|---|---|
| 1,749,854 | Change "Bitterfield" to --Staib--. |
| 3,102,047 | Change "Rwington" to --Rivington--. |
| 3,811,916 | Change "Russel" to --Russell--. |
| 3,842,163 | Change "Russel" to --Russell--. |
| Col. 3, line 51 | Change "Noval" to --Novel--. |

Signed and Sealed this

Sixteenth Day of August 1983

[SEAL]

Attest:

*Attesting Officer*

GERALD J. MOSSINGHOFF

*Commissioner of Patents and Trademarks*